(12) United States Patent
Khati et al.

(10) Patent No.: US 10,849,079 B2
(45) Date of Patent: Nov. 24, 2020

(54) POWER CONTROL FOR SYNCHRONIZATION AND DISCOVERY MESSAGES IN D2D COMMUNICATION

(71) Applicant: Apple Inc., Cupertino, CA (US)

(72) Inventors: Dhruv Khati, San Jose, CA (US); Shiva Krishna Narra, San Jose, CA (US); Sanjeevi Balasubramanian, San Jose, CA (US); Anjaneyulu Maganti, Cupertino, CA (US); Lydi Smaini, San Jose, CA (US); Tarik Tabet, San Jose, CA (US); Mohit Narang, Cupertino, CA (US); Tiberiu Muresan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/217,364

(22) Filed: Dec. 12, 2018

(65) Prior Publication Data
US 2020/0100195 A1 Mar. 26, 2020

Related U.S. Application Data

(60) Provisional application No. 62/736,857, filed on Sep. 26, 2018.

(51) Int. Cl.
| | |
|---|---|
| *H04W 52/50* | (2009.01) |
| *H04W 8/00* | (2009.01) |
| *H04W 52/38* | (2009.01) |
| *H04W 76/14* | (2018.01) |
| *H04W 92/18* | (2009.01) |
| *H04W 52/24* | (2009.01) |

(52) U.S. Cl.
CPC .......... *H04W 52/50* (2013.01); *H04W 8/005* (2013.01); *H04W 52/241* (2013.01); *H04W 52/383* (2013.01); *H04W 76/14* (2018.02); *H04W 92/18* (2013.01)

(58) Field of Classification Search
CPC .......................... H04W 52/50; H04W 52/383
See application file for complete search history.

(56) References Cited

U.S. PATENT DOCUMENTS

| | | | | |
|---|---|---|---|---|
| 2006/0003776 | A1* | 1/2006 | Natori | G08B 13/1427 455/456.3 |
| 2013/0064111 | A1* | 3/2013 | Linsky | H04W 52/243 370/252 |
| 2016/0198414 | A1* | 7/2016 | Yano | H04W 52/242 455/522 |
| 2017/0244501 | A1* | 8/2017 | Yasukawa | H04B 17/27 |
| 2018/0352554 | A1* | 12/2018 | Flynn | H04W 72/082 |
| 2019/0357154 | A1* | 11/2019 | Zeng | H04B 1/1027 |

* cited by examiner

*Primary Examiner* — Jeffrey M Rutkowski
*Assistant Examiner* — Chae S Lee
(74) *Attorney, Agent, or Firm* — Kilpatrick Townsend & Stockton LLP

(57) ABSTRACT

A power control method for device-to-device communication includes dynamically backing off transmit power value for synchronization signals and discovery messages when the distance between the two devices is less than a pre-determined threshold. The threshold distance may correspond to a distance where the receive power may exceed a pre-determined value. Embodiments may loop the transmit power of synchronization signals between a default transmit power value and backed-off values in consecutive slots of each frame.

20 Claims, 13 Drawing Sheets

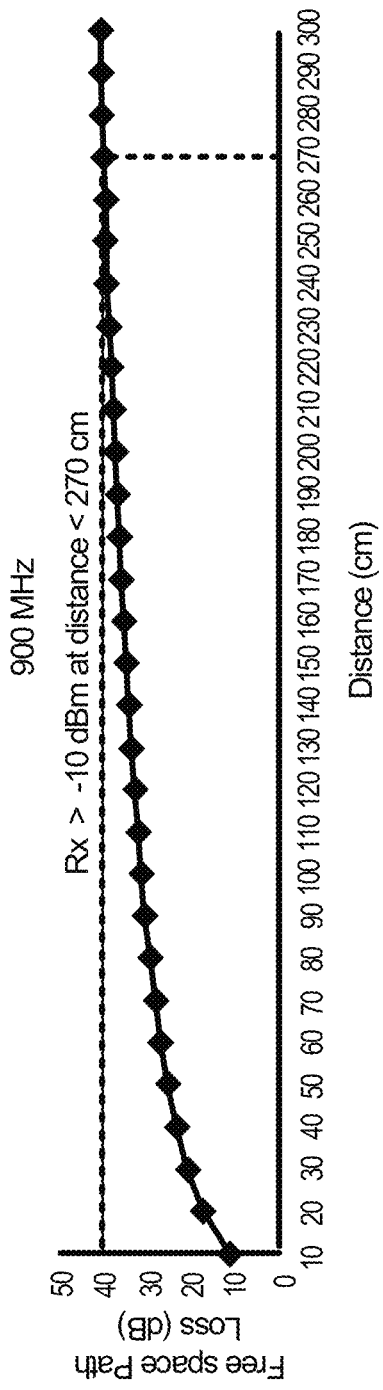
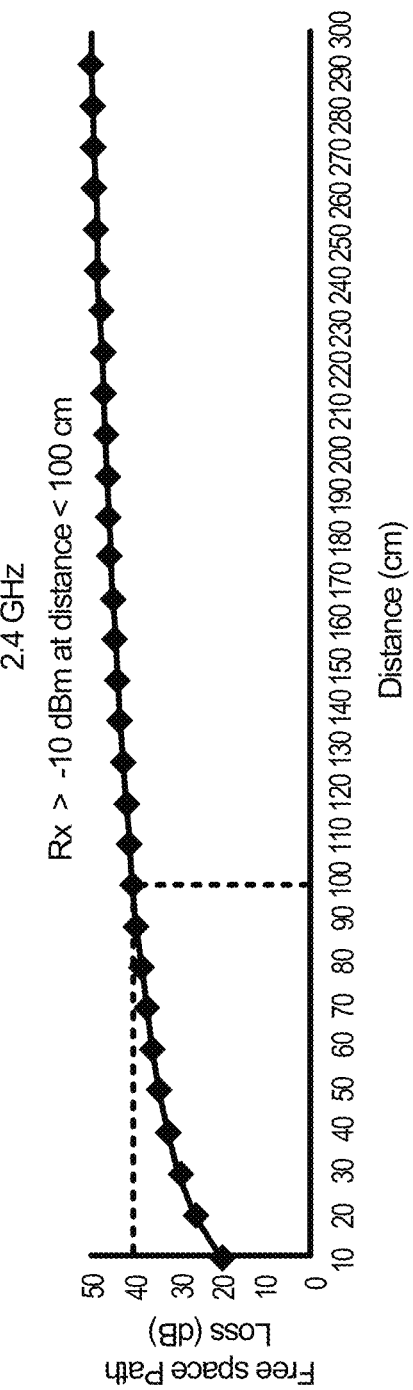
FIG. 1A
FIG. 1B

POWER CONTROL FOR SYNCHRONIZATION AND DISCOVERY MESSAGES IN D2D COMMUNICATION

CROSS-REFERENCES TO RELATED APPLICATIONS

This application claims the benefit of U.S. Provisional Patent Application No. 62/736,857, filed on Sep. 26, 2018, the content of which is incorporated by reference in its entirety.

BACKGROUND

Device-to-device (D2D) communication may be referred to as direct communication between two mobile devices without traversing a base station or core network (e.g., a cellular network). There are some situations in which a mobile device user may be outside of coverage areas of cellular communications. For example, a user may be hiking in the woods where there is no cellular coverage. As another example, cellular coverage may be lost in some areas, e.g., after a natural disaster. In such situations, it may be desirable for a mobile device, such as a smart phone, to communicate with other mobile devices in a D2D communication network. For example, in an emergency situation (e.g., an injury during hiking), a user may want to be able to send out emergency signals to people who are near. As another example, in a natural disaster (e.g., a hurricane), it may be advantageous to be able to send out messages to a large group of mobile device users in order to coordinate evacuation or rescue efforts. In some situations, D2D communication may be preferred even if there is cellular coverage. For example, in a sports stadium or in a mall, the cellular signals may be congested. A user may want to turn off cellular communication, and instead communicate with friends using D2D communication. Therefore, there is a need to improved methods of D2D communications.

SUMMARY

According to some embodiments, a power control method for device-to-device communication may include dynamically backing off transmit power for synchronization signals and discovery messages when the distance between the two devices is less than a pre-determined threshold. The threshold distance may correspond to a distance where the receive power may exceed a pre-determined value. Embodiments may loop the transmit power of synchronization signals between a default transmit power value and one or more backed-off (or reduced) values in consecutive slots of each frame.

According to some embodiments, a method of short or medium range D2D communication is provided. When it is determined that two devices are in proximity, e.g., using proximity detection, one of two modes of operation may be selected for the communication, depending on whether the synchronization state between the two devices is primary-to-secondary or secondary-to-secondary. When it is determined that the synchronization state is secondary-to-secondary, a first mode of operation may be chosen. In the first mode of operation, the devices may switch to another radio access technology (RAT), such as Bluetooth or Wi-Fi, for the short or medium range communication. When it is determined that the synchronization state is primary-to-secondary, a second mode of operation may be chosen. In the second mode of operation, the devices may stay in a D2D cellular alternative radio service (ARS) RAT.

According to some embodiments, a method of D2D communication includes, by a first mobile device, receiving an advertising signal from a second mobile device requesting a D2D communication using a first RAT; at a first communication frame, measuring a first distance between the first mobile device and the second mobile device using a proximity detection signal; and comparing the first distance to a threshold distance. The method further includes, upon determining that the first distance is less than the threshold distance, determining, at the first communication frame, whether one of the first mobile device or the second mobile device is operating in a primary state or both the first mobile device and the second mobile device are operating in a secondary state. The primary state may be configured for controlling communications with a plurality of devices. The method further includes, upon determining that one the first mobile device or the second mobile device is operating in the primary state, performing the D2D communication at the first communication frame using the first RAT; and upon determining that both the first mobile device and the second mobile device are operating in the secondary state, performing the D2D communication at the first communication frame using a second RAT different from the first RAT. In some embodiments, when the first mobile device is operating in the primary state at the first communication frame, performing the D2D communication includes, by the first mobile device, transmitting one or more synchronization signals to the second mobile device at a first transmit power value that is lower than a default transmit power value in at least one of a plurality of slots of the first communication frame. In some embodiments, the second RAT relates to Bluetooth technology or Wi-Fi technology. In some embodiments, when the first mobile device is operating in the primary state at the first communication frame, the method further includes, at a second communication frame subsequent to the first communication frame, determining whether one of the first mobile device or the second mobile device is operating in the primary state or both the first mobile device and the second mobile device are operating in the secondary state; and upon determining that both the first mobile device and the second mobile device are operating in the secondary state at the second communication frame, performing the D2D communication at the second communication frame using the second RAT. In some embodiments, the method further includes, at a second communication frame subsequent to the first communication frame, measuring a second distance between the first mobile device and the second mobile device using the proximity detection signal; comparing the second distance to a threshold distance; and upon determining that the second distance is greater than the threshold distance, performing the D2D communication at the second communication frame using the first RAT regardless of whether one of the first mobile device or the second mobile device is operating in the primary state or both the first mobile device and the second mobile device are operating in the secondary state.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 1A shows an exemplary plot of calculated free space path losses as a function of distance, for a transmission frequency of 900 MHz, according to some embodiments.

FIG. 1B shows an exemplary plot of calculated free space path losses as a function of distance, for a transmission frequency of 2.4 GHz, according to some embodiments.

DETAILED DESCRIPTION

Figure 2:
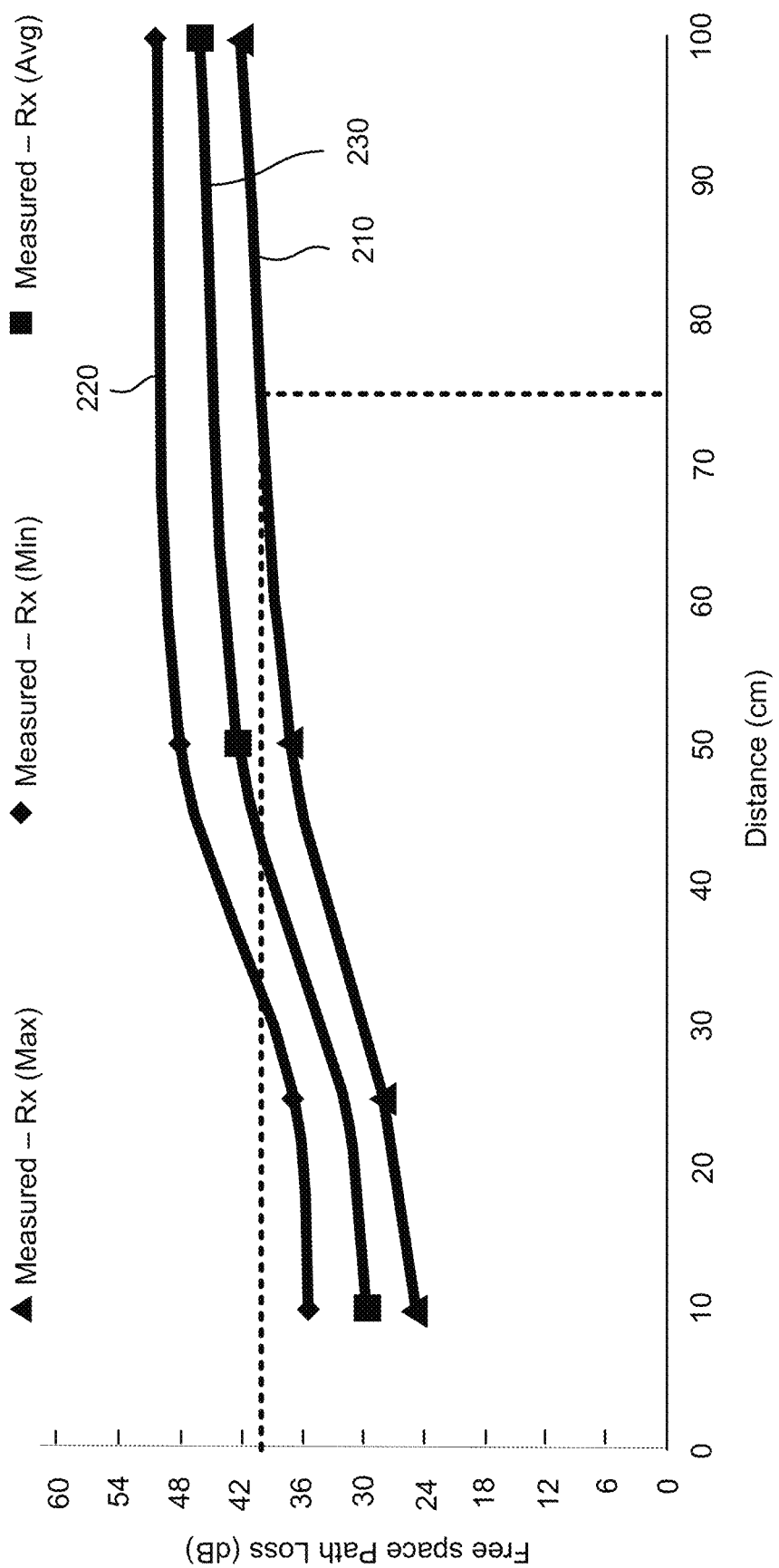
FIG. 2 shows exemplary plots of free space path losses measured at distances of 10 cm, 25 cm, 50 cm, and 100 cm between two devices according to some embodiments.

Unlike in a traditional cellular network (e.g., an LTE network) where all mobile devices (UEs) receive signals through communication towers (e.g., base stations), two mobile devices in a D2D communication implementation can be in proximity to each other, for example at distances closer than a few meters. In some situations, two mobile devices may even be stacked against each other, for example, when they are placed in a user's pocket. In cases where two devices are in close proximity, a high transmit power by a transmitting device may result in a high receive power at a receiving device.

The high receive power can potentially damage the input circuitry and/or other components, e.g., an external low noise amplifier (eLNA), of the receiving device. On the other hand, the transmitting device may also be communicating with one or more other devices that are farther away. Thus, if the transmit power is reduced so as to prevent damages to nearby devices, communication with far-away devices may be hampered. This problem is referred to as the near-far problem. Embodiments of the present disclosure provide power control methods for dynamically adjusting the transmit power, e.g., for transmitting synchronization signals and discovery messages, in D2D communication. Embodiments of the present disclosure also provide methods of short to medium range communication in a D2D communication implementation using proximity detection. When it is determined that two devices are in proximity (or proximate to one another), one of two modes of operation may be selected for the short to medium range communication, e.g., depending on the synchronization states of the two devices.

I. D2D Communications

In D2D communications, a user device may want to communicate with one or more other nearby user devices as well as one or more far away devices. For example, in an emergency situation, a user may want to use a mobile device (e.g., a smart phone) to broadcast emergency messages to all devices that are within an effective communication range of the mobile device in order to get help. It may be desirable for the mobile device to be able to communicate with devices that are nearby, so that the user can get help quickly. On the other hand, it may also be desirable for the mobile device to be able to communicate with devices that are farther away in case there are no devices nearby and/or to increase the number of potential responders.

As discussed above, the near-far problem may arise in such situations. However, there are many other situations in which the near-far problem also may arise. The near-far problem is a condition in which a receiver wants to detect a weak signal from a far-away device, while a nearby device transmits a strong signal at the same time, as the dynamic range of the receiver is usually not infinite. Received power at a receiving device may depend on the free space path loss (or power attenuation) incurred as communication signals traverse the distance between a transmitting device and the receiving device. In general, greater distances may result in greater free space path losses (hence lower received signal powers), as discussed further below.

A. Free Space Path Loss

In telecommunications, the term free-space path loss may refer to the attenuation of radio energy between a transmitting antenna and a receiving antenna that results from the line-of-sight path through free space (usually air) expressed as a power ratio (e.g., in the unit of dB). According to some embodiments, free space path losses are calculated as a function of distance for various transmission frequencies. As an example, assume that the input circuitry of a receiving device may be damaged if the receive power is greater than −10 dBm. Therefore, if the transmit power is 30 dBm and the free space path loss is less than 40 dB, the receive power may be greater than −10 dBm, which may potentially result in damage to the input circuitry of the receiving device. Thus, two devices in a D2D communication that are separated by a distance at which the free space path loss is less than 40 dB may be considered proximate. According to some embodiments, when it is determined that the two devices are in proximity, e.g., using proximity detection, a power control method may be implemented to backoff the transmit power, e.g., used to transmit synchronization signals and discovery messages in at least some frames in the D2D communication. In some embodiments, when it is determined that the two devices are in proximity, one of two modes of operation may be selected for the D2D communication, e.g., depending on the synchronization states of the two devices.

FIG. 1A shows an exemplary plot of calculated free space path losses as a function of distance, for a transmission frequency of 900 MHz, according to some embodiments. The vertical axis represents the free space path loss in dB and the horizontal axis represents the distance from a transmitting device in centimeters. As illustrated, when the distance is less than about 270 cm, the free space path loss is less than 40 dB. Therefore, assuming that the transmit power is 30 dBm, the receive power at a receiving device at a distance less than about 270 cm from the transmitting device can potentially exceed −10 dBm. Thus, the input circuitry of the receiving device can potentially be damaged.

D2D communications may operate at various frequencies. For example, radio signals with frequencies of hundreds of MHz (e.g., 900 MHz) or several GHz (e.g., 2.4 GHz) may be used. The free space path loss may depend on the operating frequencies of the D2D communication. Typically, the path loss may be higher at the same distance for higher frequencies. FIG. 1B shows an exemplary plot of calculated free space path losses as a function of distance, for a transmission frequency of 2.4 GHz, according to some embodiments. As illustrated, the maximum distance at which the free space path loss is less than 40 dB is reduced to 100 cm, compared to 270 cm where the transmission frequency is 900 MHz as illustrated in FIG. 1A. Note that communication signals can still be detected at distances greater than 100 cm, but the receive power may be less than the safety threshold of −10 dBm. Accordingly, devices separated by at least 100 cm when transmissions are at 2.4 GHz may not be considered to be in proximity.

Figure 3:
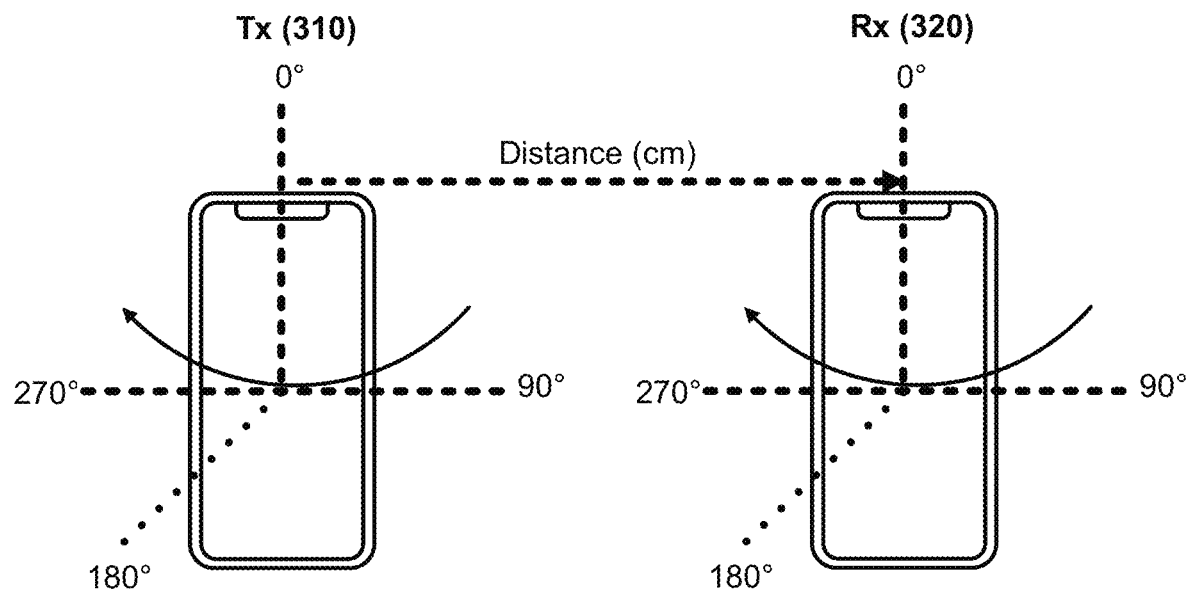
FIG. 3 illustrates schematically an example of relative orientation of two mobile devices, where the free space path losses shown in FIG. 2 are measured.
Figure 4:
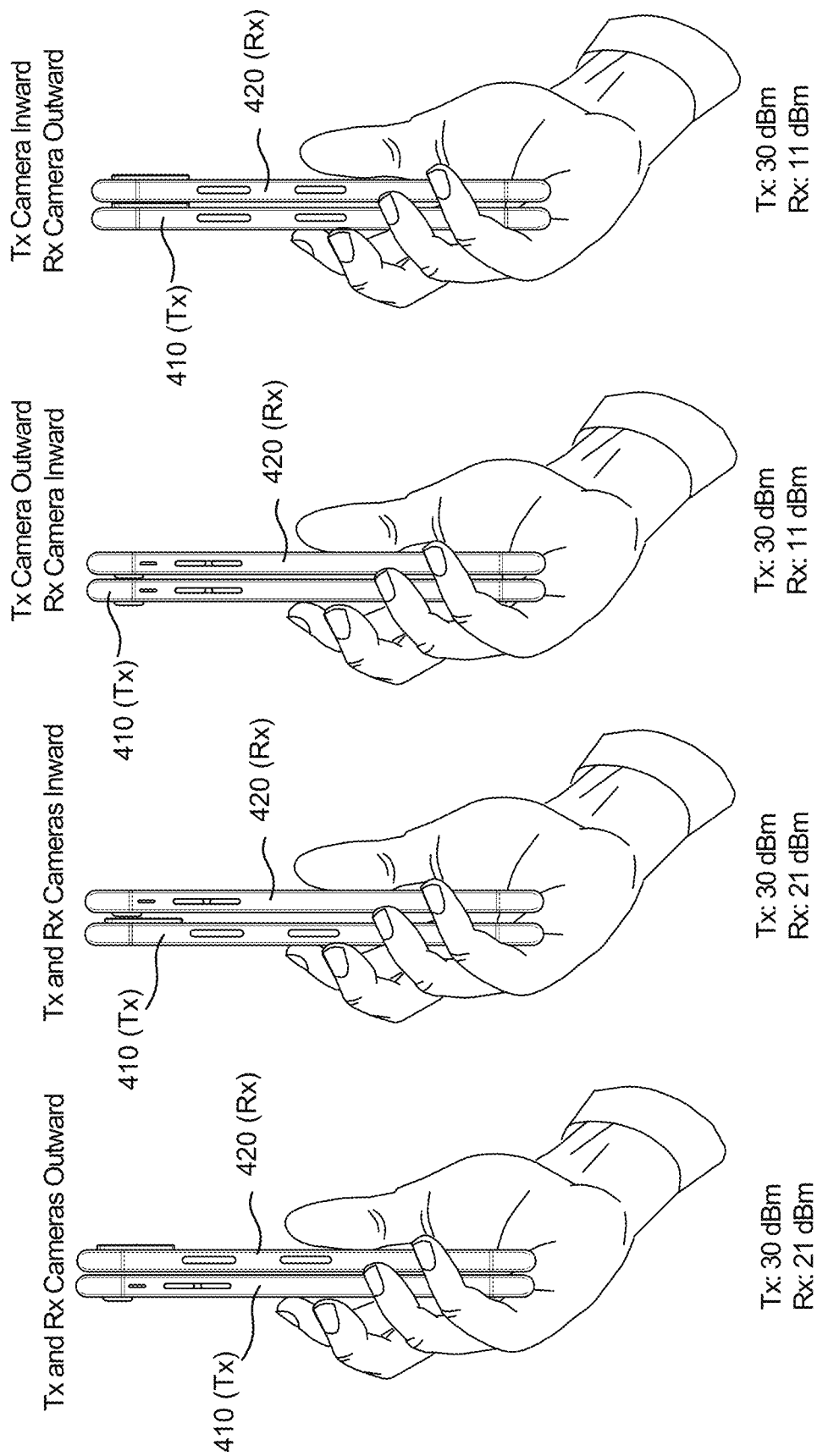
FIGS. 4A-4D illustrate four different example configurations, where the front sides of the two devices face away from each other (e.g., their cameras both facing outward, FIG. 4A), face toward each other (i.e., their cameras both facing inward, FIG. 4B), and face in the same direction (e.g., one camera faces outward and the other camera faces inward, FIGS. 4C and 4D).

FIG. 2 shows exemplary plots of free space path losses measured at distances of 10 cm, 25 cm, 50 cm, and 100 cm between two devices according to some embodiments. The transmission frequency is 900 MHz. For each distance, 16 samples are collected for various relative orientations between the transmitting device 310 and the receiving device 320, as illustrated in FIG. 3. Multiple samples are collected for different relative orientations, because receive power at the same distance may vary depending on the relative orientations. For example, the receive power may be greater when the orientations of the two devices are 180 degrees apart (e.g., when the two devices face each other or face opposite to each other, for example as illustrated in FIGS. 4A and 4B) than when the two devices are in the same orientation (e.g., as illustrated in FIGS. 4C and 4D).

Referring to FIG. 2, for each distance, a maximum receive power among the 16 samples, which corresponds to a minimum free space path loss (represented by the triangles and the line 210), is determined. For each distance, a minimum receive power among the 16 samples, which may correspond to a maximum free space path loss (represented by the diamonds and the line 220), is also determined. In addition, for each distance, an average receive power among the 16 samples (represented by the squares and the line 230) is determined. As illustrated, at distances less than about 75 cm, the path loss may be less than 40 dB in the worst case (represented by the line 210, which may correspond to maximum receive power).

In some embodiments, receive powers may be measured between two devices that are in direct contact, e.g., stacked together. Such situations may occur, for example, when the two devices are placed together into a user's pocket, purse, etc. FIGS. 4A-4D illustrate four different configurations, where the front sides of the two devices (e.g., a transmitting device Tx 410 and a receiving device Rx 420) face away from each other (e.g., their cameras both facing outward, FIG. 4A), face toward each other (e.g., their cameras both facing inward, FIG. 4B), and face in the same direction (e.g., one camera faces outward and the other camera faces inward, FIGS. 4C and 4D). For a 30 dBm transmit power by the transmitting device Tx 410, the receive power at the receiving device Rx 420 can be as high as 21 dBm when the front sides of the two devices face away from each other or face toward each other. Even when the front sides of the two devices face in the same direction, the receive power can still be as high as 11 dBm. Therefore, when the two devices are stacked together (or are otherwise in contact), the received power can be high enough to cause potential damage to the input circuitry of the receiving device.

B. Proximity Measurement

According to various embodiments, a distance (or path loss) between two devices may be determined by measuring received signal strength indication (RSSI), signal-to-interference noise-ratio (SINR), or time of flight (TOF) of a beacon signal. For examples, RSSI and SINR may be measured using Bluetooth Low Energy (BLE, e.g., iBeacon) or Wi-Fi, and TOF may be measured using Ultra Wideband (UWB).

In telecommunications, RSSI is the relative received signal strength in a wireless environment. RSSI is an indication of the power level being received by a receiving device. The RSSI is larger when an emitting device is closer to the receiving device and is smaller when the emitting device is farther from the receiving device. Thus, physical proximity can be estimated using the RSSI value. In various embodiments, a single measurement or multiple measurements can be performed, and then used to make a proximity determination. When multiple measurements are performed, the measurements can be combined to provide the signal strength value. Multiple measurements may be made to increase accuracy.

In wireless communication systems, analogous to the SNR used often in wired communications systems, the SINR is defined as the power of a certain signal of interest divided by the sum of the interference power (from all the other interfering signals) and the power of some background noise. Since typically the energy of a signal fades with distance due to path loss, SINR can be used to measure a distance between a transmitting device and a receiving device.

UWB may be suitable for TOF measurements for determining distances. The Federal Communications Commission (FCC) defines UWB as an RF signal occupying a portion of the frequency spectrum that is greater than 20% of the center carrier frequency, or has a bandwidth greater than 500 MHz. UWB is a communication channel that spreads information out over a wide portion of the frequency spectrum. This allows UWB transmitters to transmit large amounts of data while consuming relatively little transmit energy. UWB can be used for positioning by utilizing the time difference of arrival (TDOA) of the RF signals to obtain the distance between the reference point and the target. UWB technology uses radio waves with very short impulse transmissions. The short bursts of signals with sharp rises and drops make the signals' rising edges or falling edges suitable for accurate determination of TDOA. Thus, the distance between two UWB devices may be measured relatively accurately by measuring the time that it takes for a radio wave to pass between the two UWB devices. The detection range of UWB technology may be up to about 30 m.

II. Power Control Methods for Synchronization Signals and Discovery Messages in D2D Communication As discussed above, the near-far problem may arise in a D2D communication where a receiving device wants to detect a weak signal from a far-away device, while a nearby device transmits a strong signal at the same time. According to some embodiments, a power control method dynamically backs off transmit power of synchronization signals and discovery messages when the distance between two devices is less than a pre-determined threshold. The distance between the two devices can be measured using, for example, any of RSSI, SINR, or TOF, as described above. The threshold distance may correspond to a distance at which the path loss is less than a pre-determined threshold value (e.g., less than 30 dB).

A. Backed-Off Transmit Power

According to some embodiments, a backed-off transmit power may be determined based on the default transmit power, the pre-determined path loss threshold value, and the safety threshold power value. The default transmit power may be the power at which a transmitting device transmits synchronization signals and/or discovery messages when the two devices are not in proximity. For example, the default transmit power may be 30 dBm. The safety threshold power value may be an upper limit of receive power, above which damage to the input circuitry of the receiving device may occur. For example, the safety threshold power value may be −10 dBm. As an example, if a path loss between the two devices is measured to be 30 dB from proximity detection, the backed-off (or reduced) power value may be set to 20 dBm, so that the received power at the receiving device may be −10 dBm or less.

The communications between the devices can be implemented using frames. A frame can refer to a digital data transmission unit in computer networking and telecommunication. A frame typically includes frame synchronization features comprising of a sequence of bits or symbols that indicate to the receiver, the beginning and end of the payload data within the stream of symbols or bits it receives. A frame may include a number of slots.

Figure 5:
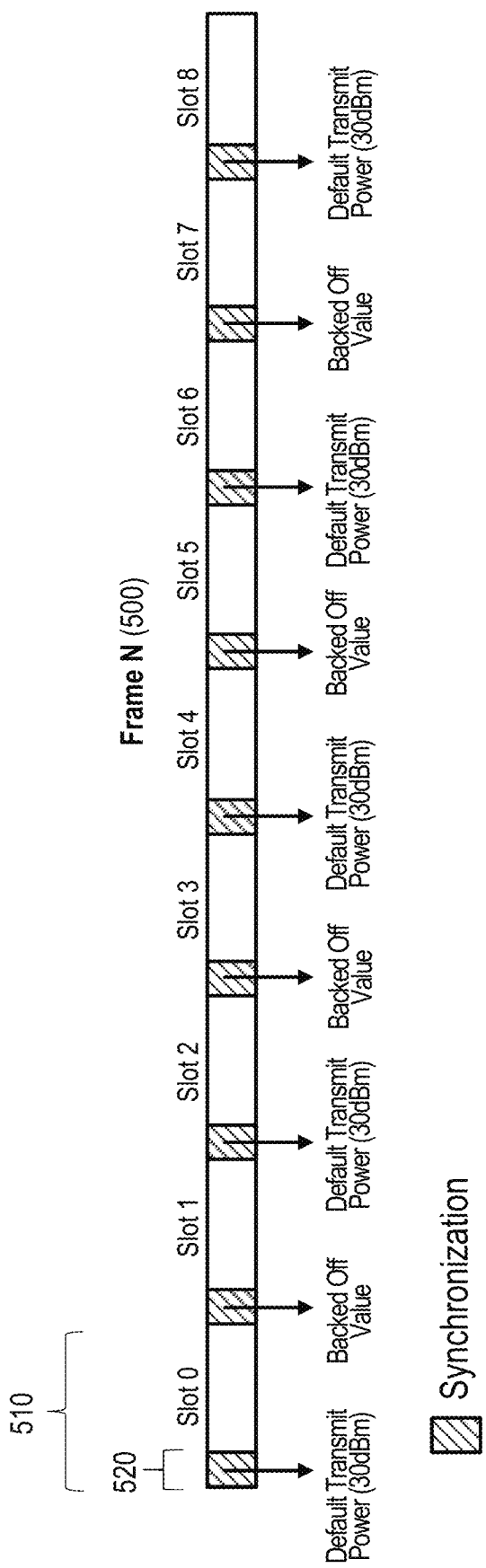
FIG. 5 illustrates an exemplary power sequence for transmitting synchronization signals in a frame according to some embodiments.

According to some embodiments, a power control method may loop the transmit power for transmitting synchronization signals between a default power value and a backed-off value in consecutive slots of a frame. FIG. 5 illustrates an exemplary power sequence for transmitting synchronization signals in a frame 500 according to some embodiments. Each frame 500 may be, for example, 342 ms long. Each frame 500 may include, for example, 9 slots 510. Each slot 510 may be, for example, 38 ms long. The first segment 520 of each slot 510 may be designated for synchronization signals. The first segment 520 may be, for example, 5 ms long.

As illustrated in FIG. 5, the transmit power for the synchronization signals may alternate between a default transmit power value (e.g., 30 dBm) and a backed-off power value (e.g., 20 dBm) in the consecutive slots 510 of one or more frames 500. Transmitting the synchronization signals at the default transmit power value in alternating slots may increase the likelihood that devices outside of the proximity range (e.g., with a path loss greater than about 30 dB) may receive the synchronization signals, whereas transmitting the synchronization signals at the backed-off value in alternating slots may mitigate (or reduce) the chance of damaging the input circuitry of those devices within the proximity range.

Figure 6:
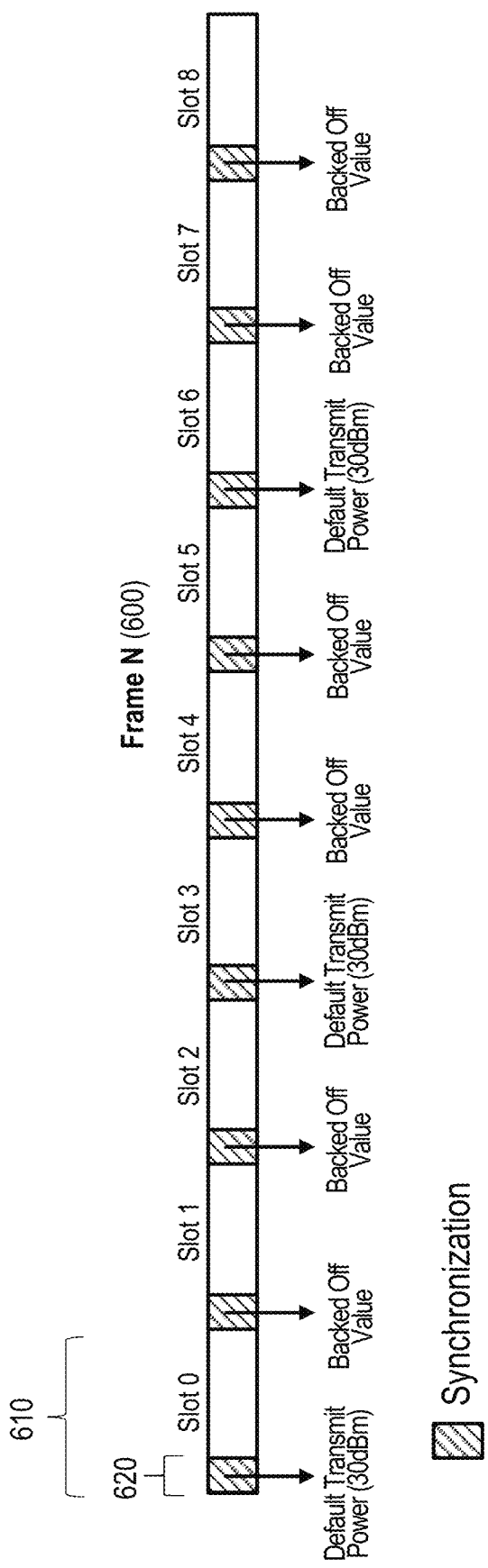
FIG. 6 illustrates another exemplary power sequence for transmitting synchronization signals in a frame according to some other embodiments.

According to various embodiments, the duty cycle of the transmit power (e.g., the ratio of the number of slots at the default power value to the total number of slots in a frame; the duty cycle illustrated in FIG. 5 is about ½) may have other patterns within one or more frames. FIG. 6 illustrates another exemplary power sequence for transmitting synchronization signals in a frame 600 according to some other embodiments. The first segment 620 of each slot 610 may be designated for synchronization signals. Here, the synchronization signals are transmitted at the default power value in one slot 610 and at the backed-off value in two subsequent slots, before looping back to the default power value, resulting in a duty cycle of about ⅓. Other duty cycle patterns are also possible. For example, the synchronization signals may be transmitted at the default power value in one slot followed by the backed-off value in three or more subsequent slots, before looping back to the default power value.

The transmit power may be dynamically adjusted based on continuous or frequent proximity detection. For example, if it is detected that the distance between the transmitting device and the receiving device has decreased, the duty cycle of the transmit power may be decreased accordingly, or vice versa. When it is detected that the receiving device is no longer in proximity of the transmitting device, the transmit power may be set to the default power value for all slots.

In some embodiments, proximity detection time intervals may be dynamically adapted depending on relative motion of devices. For example, a proximity detection time interval may be set to a default value of 342 ms, corresponding to a detection frequency of once per frame. If it is determined that the receiving device is moving away from the transmitting device, the proximity detection time interval may be increased. Conversely, if it is determined that the receiving device is moving toward the transmitting device, the proximity detection time interval may be decreased, so that transmit power can be adjusted accordingly in time. Determining whether the receiving device is moving away or moving toward the transmitting device may be based on a change in signal strength.

Figure 7:
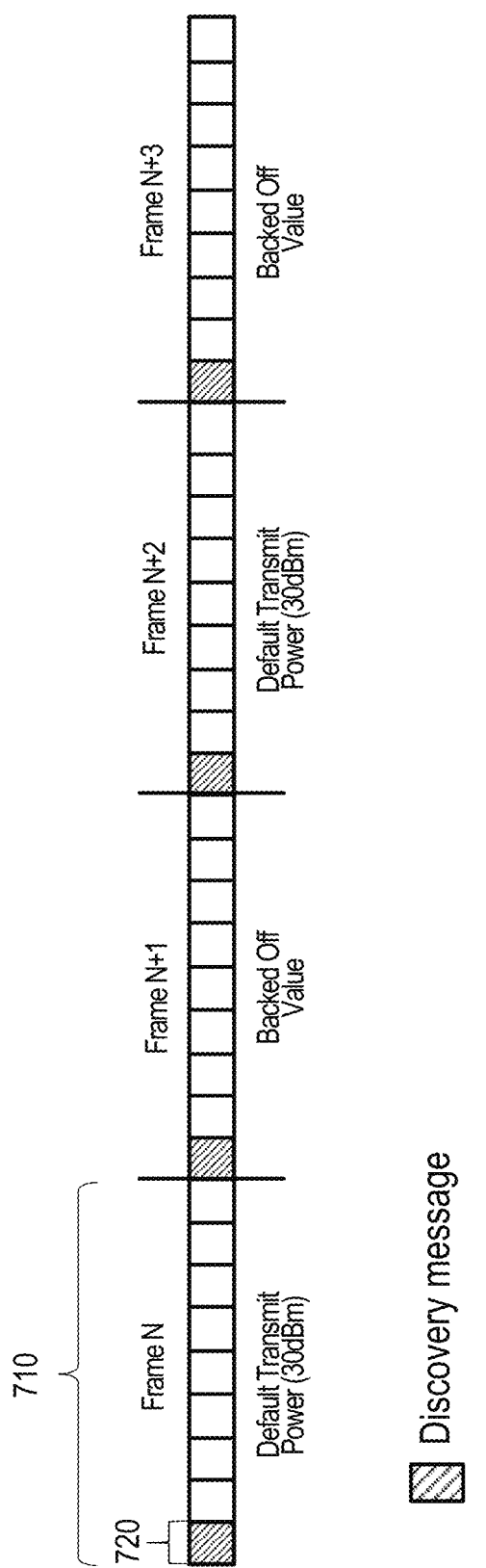
FIG. 7 illustrates an exemplary power sequence for transmitting discovery messages in consecutive frames according to some embodiments.

According to some other embodiments, a power control method may loop the transmit power for transmitting discovery messages between a default power value and a backed-off power value in consecutive frames, e.g., when it is determined that a receiving device is proximate to a transmitting device. FIG. 7 illustrates an exemplary power sequence for transmitting discovery messages in consecutive frames 710 according to some embodiments. The first slot 720 of a frame 710 may be designated for the discovery message. As illustrated, the transmit power for the discovery messages may alternate between a default power value (e.g., 30 dBm) and a backed-off power value (e.g., 20 dBm) in consecutive frames 710. Other sequence patterns may be used according to some other embodiments. For example, a default transmit power in one frame may be followed by a backed-off value in two or more subsequent frames.

In some embodiments, in case of a discovery failure, the transmitting device may attempt more discovery retries, since the transmitting device already knows that the receiving device is within its proximity.

B. Transmit Power Adjustment

As illustrated in FIGS. 1A and 1B, path loss may vary for different operating frequencies. For example, the path loss at an operating frequency of 900 MHz is less than the path loss at an operating frequency of 2.4 GHz over the same distance. Bluetooth and Wi-Fi use 2.4 GHz in the industrial, scientific, and medical radio band (ISM band), and UWB uses frequencies between 3.1 GHz and 10.6 GHz. If the operating frequency of a D2D communication is lower than the frequency used for proximity detection (e.g., using iBeacon, Wi-Fi, UWB, etc.), the actual path loss at the operating frequency can differ from (e.g., be less than) what is measured during the proximity detection.

According to some embodiments, a power adjustment factor K may be applied to the backed-off power value when the operating frequency of the D2D communication differs from (e.g., is less than) the frequency at which path loss is measured. For example, if the path loss is measured using 2.4 GHz signals and the operating frequency of the D2D communication is 900 MHz, a power adjustment factor of −10 dBm may be applied to the backed-off power value. Following the example discussed above, if the default transmit power is 30 dBm and a normal backed-off power value is 20 dBm, a power adjustment factor K of −10 dBm may result in a backed-off power value of 10 dBm. For other operating frequencies of the D2D communication, the power adjustment factor K may have other values, e.g., corresponding to the relationship between frequencies used for the ranging communication and the D2D communication.

C. Operation of Power Control Method

Figure 8:
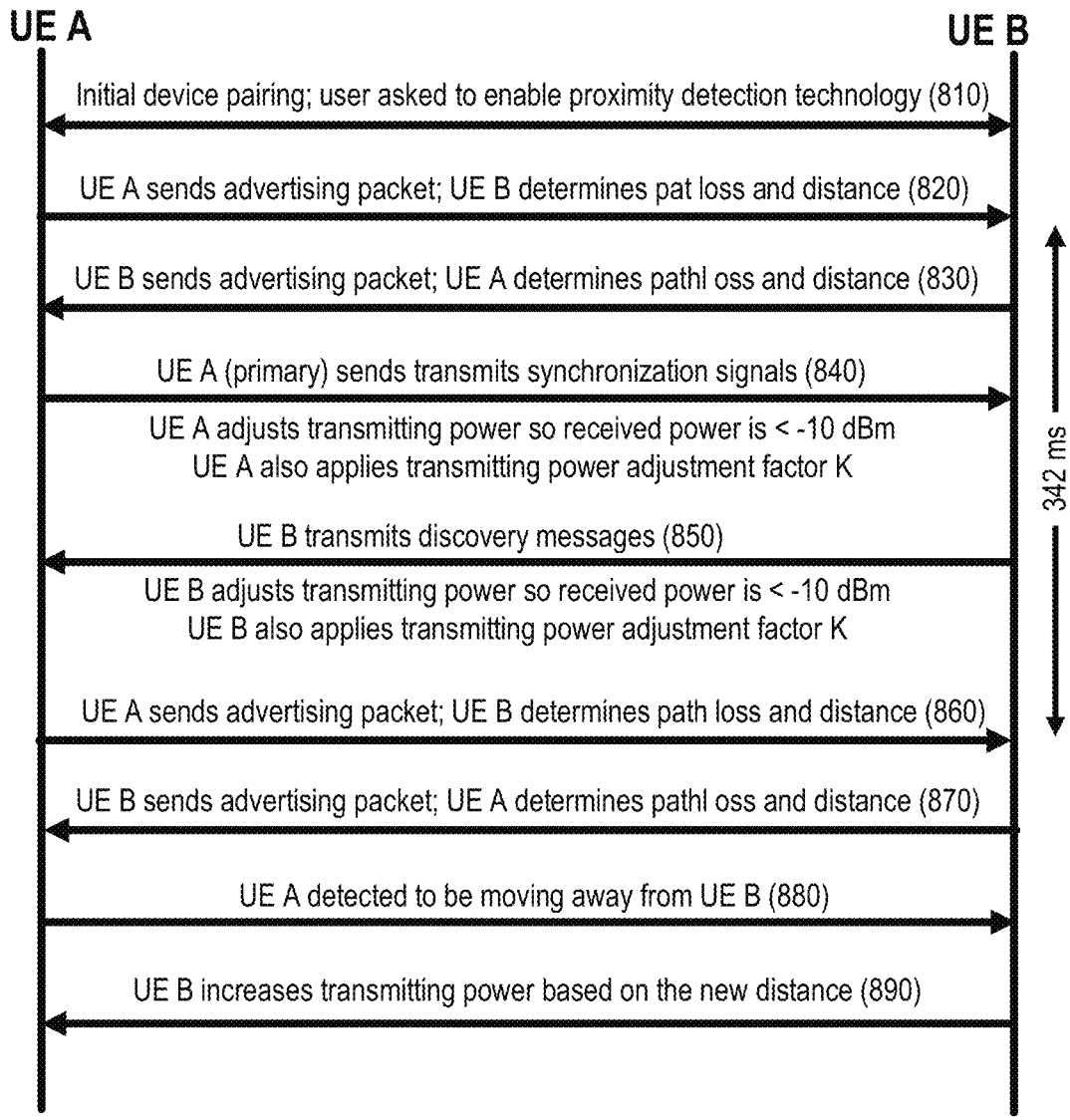
FIG. 8 shows a diagram illustrating am exemplary operation of a power control method in a D2D communication between two devices using proximity detection according to some embodiments.

FIG. 8 shows a diagram illustrating an exemplary operation of a power control method in a D2D communication between a first user equipment (UE A) and a second user equipment (UE B), using proximity detection, according to some embodiments.

At 810, initial device pairing is performed. In the initial device pairing, UE A or UE B may request to enable proximity detection, e.g., for detecting nearby devices. UE A and UE B may assign their UE ARS IDs to proximity detection IDs. For example, proximity detection may utilize Bluetooth (including BLE, e.g., iBeacon), Wi-Fi, UWB, or the like.

At 820, UE A may send an advertising packet to UE B. In response to receiving the advertising packet, UE B may determine path loss and distance using a proximity detection technology (e.g., iBeacon, Wi-Fi, or UWB).

At 830, UE B may send an advertising packet to UE A. In response to receiving the advertising packet, UE A may determine path loss and/or distance.

At 840, UE A, acting as a primary device, may transmit synchronization signals to UE B. If UE A determines that UE B is proximate, e.g., from the proximity detection, UE A may apply the power control method described above to loop the transmit power of the synchronization signals in consecutive slots between a default power value (e.g., 30 dBm) and one or more backed-off values (e.g., 20 dBm) with an appropriate duty cycle (e.g., as illustrated in FIGS. 5 and 6). The one or more backed-off power values may be set such that the received power is below a safety threshold value (e.g., −10 dBm). UE A may also apply a power adjustment factor K (e.g., −10 dBm) if the operating frequency of the D2D communication differs from (e.g., is lower than) the frequency of the proximity detection signals, as described above.

At 850, UE B may transmit a discovery message to UE A. UE B may apply the power control method described above to loop the transmit power of the discovery messages in consecutive frames between a default power value (e.g., 30 dBm) and one or more backed-off values (e.g., 20 dBm) with an appropriate duty cycle (e.g., as illustrated in FIG. 7). UE B may also apply a power adjustment factor K (e.g., −10 dBm) if the operating frequency of the D2D communication differs from (e.g., is lower than) the frequency of the proximity detection signals.

At 860, UE A may send another advertising packet to UE B. In response to receiving the advertising packet, UE B may determine path loss and/or distance.

At 870, UE B may send another advertising packet to UE A. In response to receiving the advertising packet, UE A may determine path loss and/or distance.

At 880, it may be determined that UE A and UE B are moving away from each other, for example, based on a change in signal strength.

At 890, upon determining that UE A and UE B are moving away from each other, UE B may increase the transmit power for transmitting advertising packets to the default power value for subsequent frames.

D. Method of Power Control in D2D Communication

Figure 9:
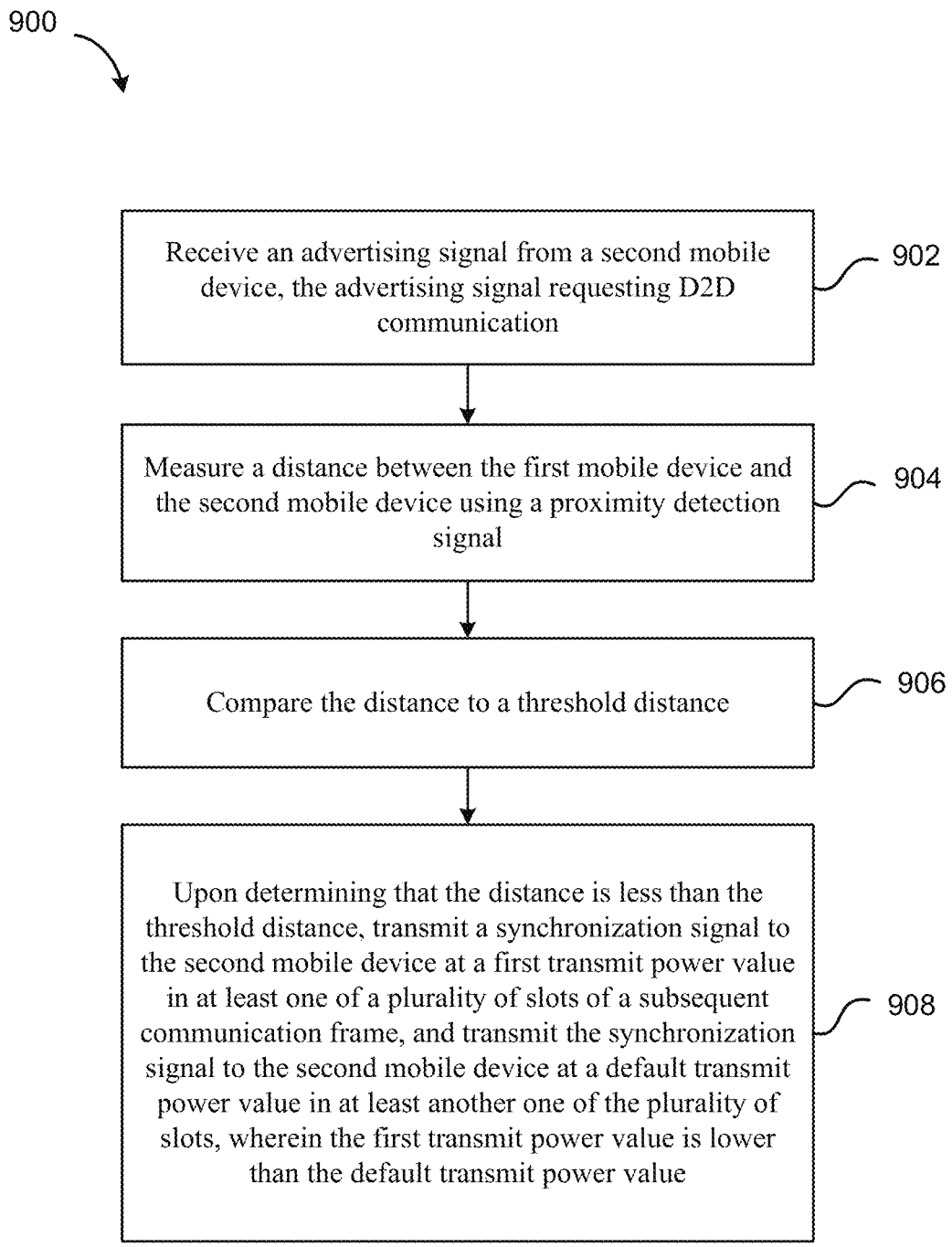
FIG. 9 is a flowchart illustrating an exemplary method of power control in D2D communication according to some embodiments.

FIG. 9 is a flowchart illustrating an exemplary method 900 of power control in D2D communication according to some embodiments.

At 902, a first mobile device receives an advertising signal from a second mobile device. The advertising signal requests D2D communication. Step 902 may be considered as a device paring step.

At 904, the first mobile device measures a distance between the first mobile device and the second mobile device using a proximity detection signal. For example, the proximity detection signal may be a Bluetooth signal or a Wi-Fi signal. The proximity detection may be based at least in part on RSSI or SINR of the proximity detection signal. In some other examples, the proximity detection signal may be a UWB signal, and the proximity detection may be based at least in part on TOF of the proximity detection signal.

At 906, the first mobile device compares the distance to a threshold distance. For example, the threshold distance may correspond to a distance at which free space path loss value is less than a predetermined threshold value.

At 908, upon determining that the distance is less than the threshold distance, the first mobile device transmits a synchronization signal to the second mobile device at a first transmit power value that is lower than a default transmit power value in at least one of a plurality of slots of a subsequent communication frame, and transmits the synchronization signal to the second mobile device at the default transmit power value in at least another one of the plurality of slots. For example, the first mobile device may transmit the synchronization signal by alternating between the default transmit power value and the first transmit power value, as illustrated in FIG. 5. In other embodiments, the first mobile device may loop through a sequence of slots using one or more other patterns.

It should be appreciated that the specific steps illustrated in FIG. 9 provide a particular method of power control in D2D communication according to some embodiments. Other sequences of steps may also be performed according to alternative embodiments. For example, alternative embodiments of the present disclosure may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

III. Using Proximity Detection for Short Range Communication in a D2D Network

Embodiments of the present disclosure provide methods of short and/or medium range communication in a D2D communication network using proximity detection. When it is determined that two devices are in proximity, one of two modes of operation may be selected for the communication, e.g., depending on the synchronization states of the two devices.

A. Primary and Secondary Synchronization States

In computer networking, primary-secondary (also referred to as master-slave) is a model for a communication protocol in which one device (referred to as primary or master) controls the communication with one or more other devices (referred to as secondary or slave). Once the primary-secondary relationship is established, the direction of control is from the primary device to the secondary device(s).

Figure 10B:
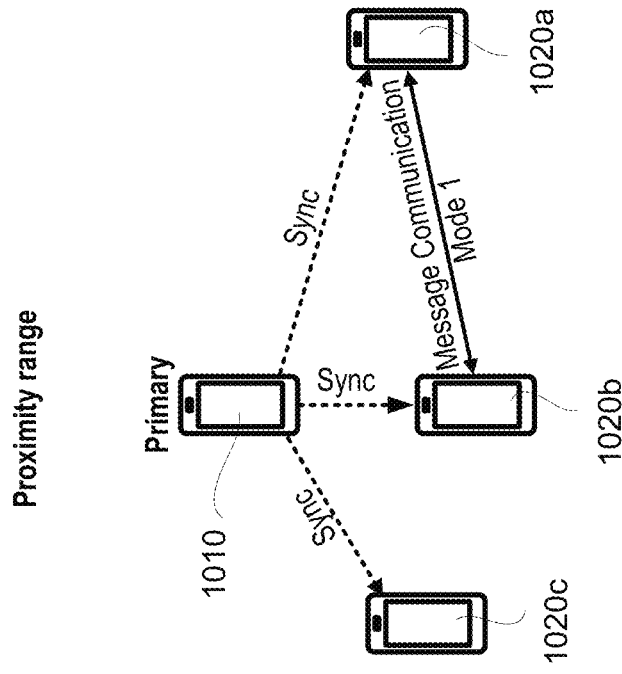
FIGS. 10A and 10B illustrate schematically examples of different synchronization states in a D2D communication network.
Figure 10A:
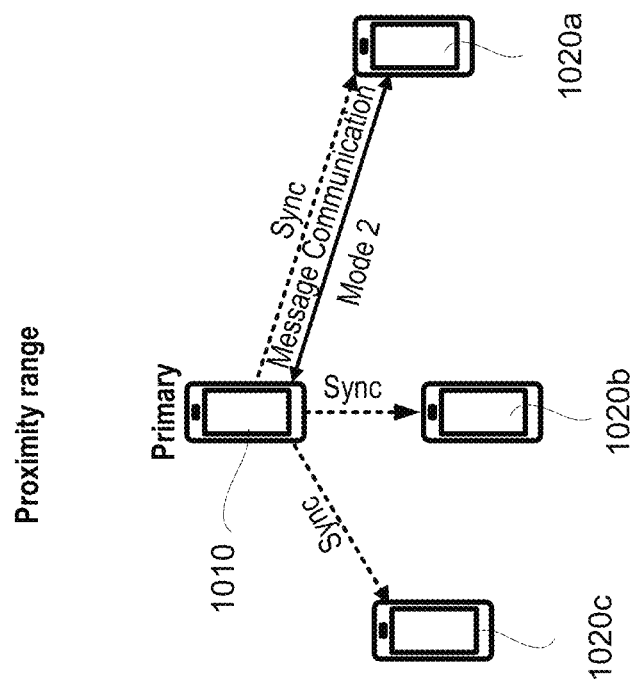

FIGS. 10A and 10B illustrate schematically examples of different synchronization states in a D2D communication network. The D2D communication network may include a primary device 1010 and a number of secondary devices 1020*a*, 1020*b*, and 1020*c*. The primary device 1010 may send synchronization signals to the secondary devices 1020*a*, 1020*b*, and 1020*c* to facilitate D2D communication sessions. In the example illustrated in FIG. 10A, the primary device 1010 is communicating with the secondary device 1020*a*. In the example illustrated in FIG. 10B, the secondary device 1020*a* is communicating with another secondary device 1020*b*.

The synchronization state may change for different communication sessions. For instance, in the example illustrated in FIG. 10B, the device 1020*a* may become a primary device in another communication session. Thus, the synchronization state of the new communication session between the two devices 1020*a* and 1020*b* is changed from between two secondary devices to between a primary device and a secondary device.

B. Two Alternative Modes of Operation

According to some embodiments, if two devices in a D2D communication are detected to be in proximity (e.g., using proximity detection technologies such as iBeacon, Wi-Fi, and/or UWB), one of two modes of operation will be used for the short or medium range communication depending on the devices' synchronization state, as described in more detail below. This may help the devices save power and prevent potential damage to the receiving device, e.g., due to a high receive power.

In some embodiments, when it is determined that both devices in the communication are secondary devices (e.g., between the secondary device 1020*a* and the secondary device 1020*b* as illustrated in FIG. 10B), a first mode of operation is chosen. In the first mode of operation, the devices may switch from an alternative radio service (ARS) RAT, such as a cellular D2D RAT, to another radio access technology (RAT), such as Bluetooth or Wi-Fi, for the communication.

When it is determined that one of the devices in the short or medium range communication is a primary device (e.g., the primary device 1010 as illustrated in FIG. 10A), a second mode of operation is chosen. In the second mode of operation, the devices may remain on the ARS RAT for the communication. By way of example, the devices may remain on the existing RAT (e.g., the ARS RAT) so that the primary device can control communications with one or more other secondary devices. In the second mode of operation, the power control methods described above may be applied for transmitting synchronization signals and discovery messages.

An alternative radio service (ARS) is one type of radio access technology (RAT) for D2D communication. The D2D communications may include text messages as well as voice messages. The communication range can be as far as several tens of kilometers. In some implementations, an ARS may operate in one or more unlicensed frequencies, such as 900 MHz, 2.4 GHz, 5 GHz, or the like. Different countries may have different unlicensed frequency bands.

C. Operations of Communications using Proximity Detection

Figure 11:
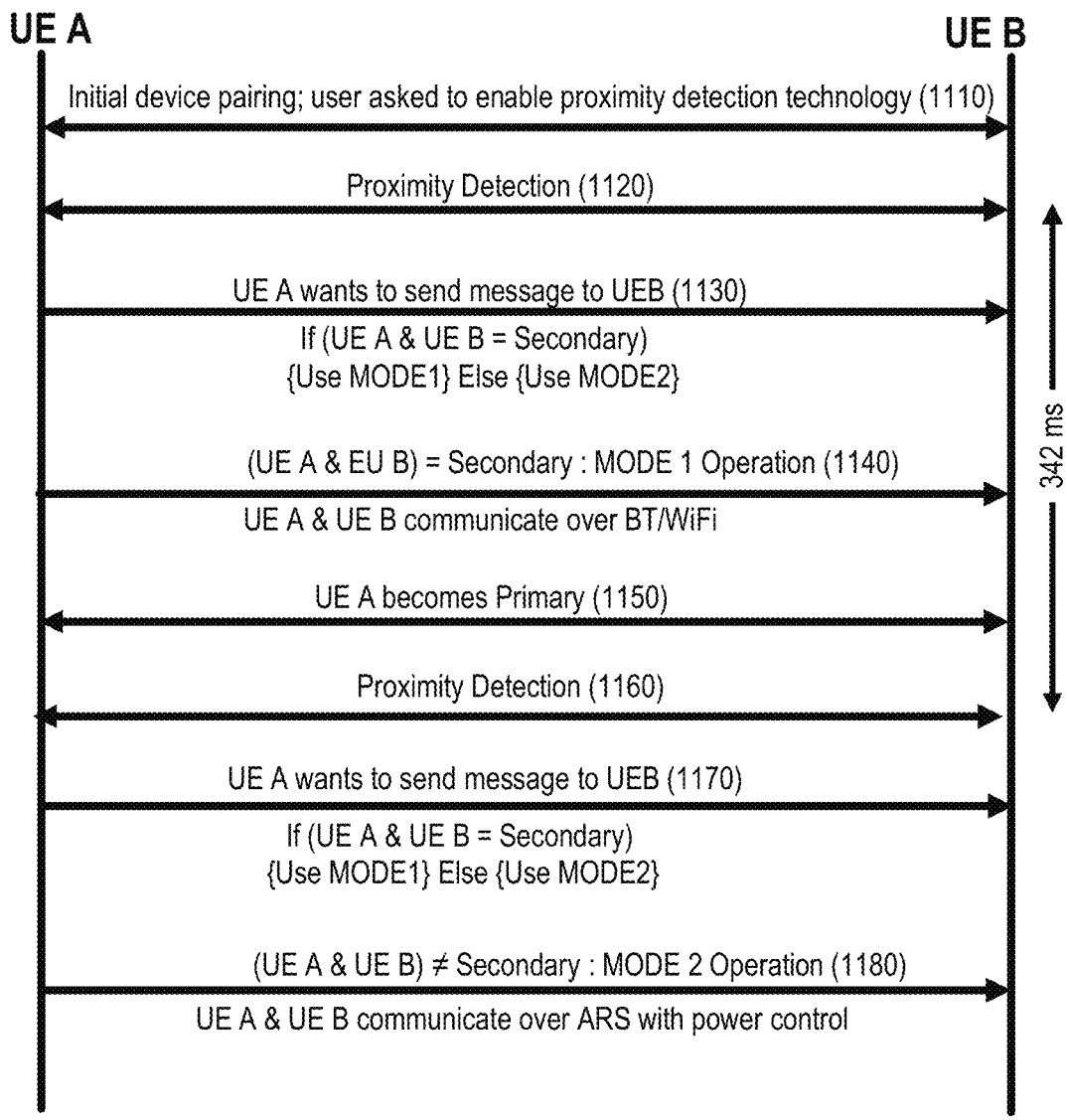
FIG. 11 shows a diagram illustrating exemplary operations of short range communications between two devices using proximity detection according to some embodiments.

FIG. 11 shows a diagram illustrating exemplary operations of short and/or medium range communications between a first user equipment (UE A) and a second user equipment (UE B), using proximity detection, according to some embodiments.

At 1110, initial device pairing is performed. In the initial device pairing, UE A or UE B may request to enable proximity detection for detecting nearby users.

At 1120, proximity detection may be performed using a proximity detection technology, such as iBeacon, Wi-Fi, UWB, or the like, as described above. It may be detected that UE A and UE B are in proximity if the coupling loss is less than, e.g., 40 dB. For example, assuming the operating frequency is 900 MHz, a coupling loss less than 40 dB may correspond to a distance of less than 275 cm between UE A and UE B. However, in other implementations, one or more other coupling loss thresholds can be used to define when devices are proximate.

At 1130, UE A may send a request for sending messages to UE B. Since it has been detected that UE A and UE B are in proximity, one of two operation modes, a first mode (mode 1) or a second mode (mode 2), is selected for the communication depending on the synchronization states of UE A and UE B. If both UE A and UE B are secondary devices, the first mode is selected; otherwise, the second mode is selected. In the first mode, UE A and UE B may be switched from the ARS RAT to another RAT, such as Bluetooth or Wi-Fi, for the communication. In the second mode, UE A and UE B will remain on the ARS RAT for the communication, as discussed above.

At 1140, it is determined that both UE A and UE B are secondary devices. Therefore, UE A sends messages to UE B in the first mode of operation, i.e., using another RAT such as Bluetooth or Wi-Fi for the communication session.

At 1150, in a second instance of time, it may be determined that UE A has become a primary device.

At 1160, proximity detection may be performed again using a proximity detection technology, such as iBeacon, Wi-Fi, UWB, or the like, as described above. It may be detected that UE A and UE B are in proximity based on the distance measured using the proximity detection technology.

At 1170, UE A may send a request for sending messages to UE B. Since it has been detected that UE A and UE B are in proximity, one of the first mode and the second mode is selected for the communication depending on the synchronization states of UE A and UE B.

At 1180, it is determined that UE A is a primary device. Therefore, UE A sends messages to UE B in the second mode of operation. In this communication session, the power control methods described above may be applied when UE A sends synchronization signals or discovery messages to UE B.

D. Method of D2D Communication using Proximity Detection

Figure 12:
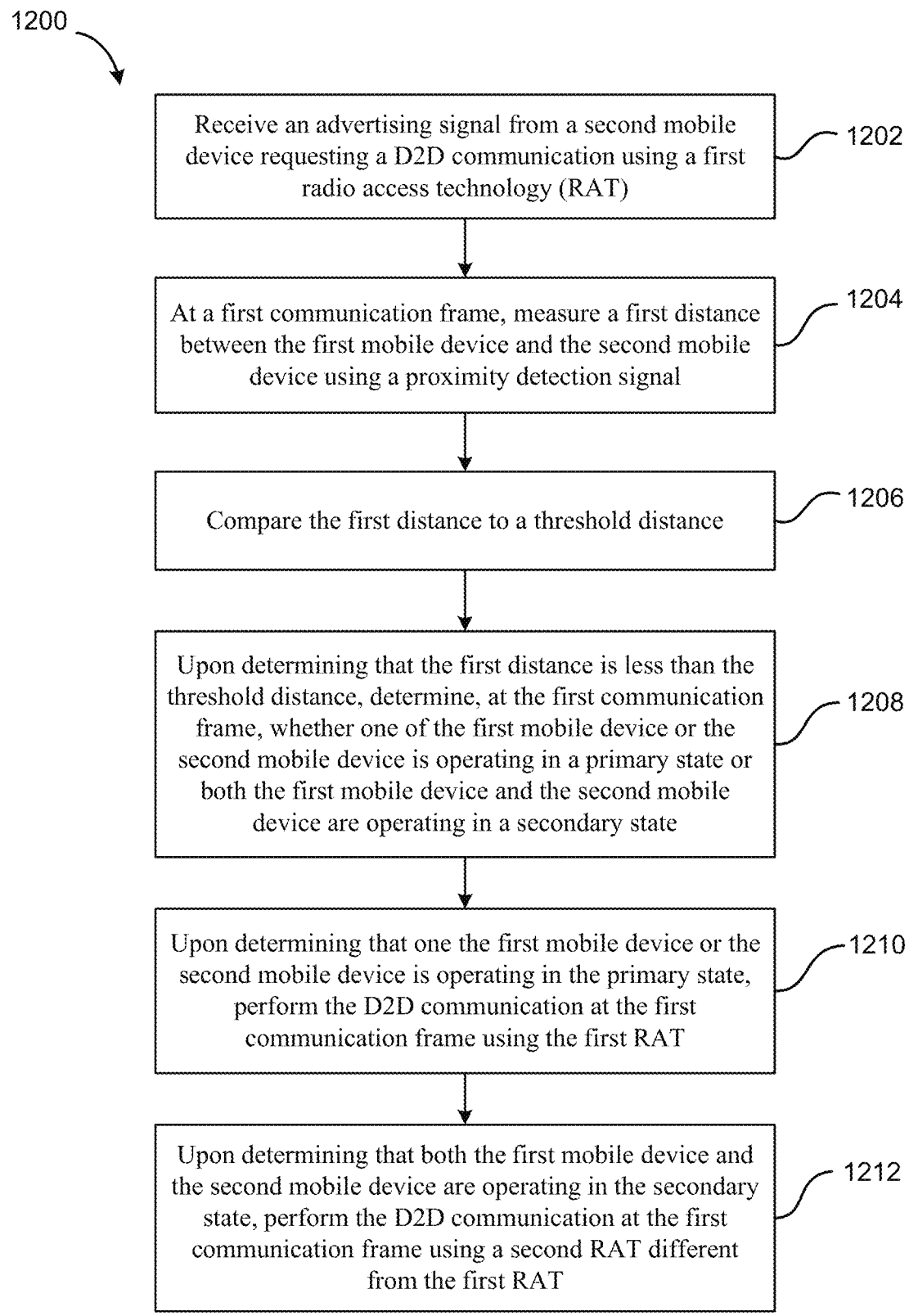
FIG. 12 is a flowchart illustrating an exemplary method of D2D communication using proximity detection according to some embodiments.

FIG. 12 is a flowchart illustrating an exemplary method 1200 of D2D communication using proximity detection according to some embodiments.

At 1202, a first mobile device receives an advertising signal from a second mobile device requesting a D2D communication using a first radio access technology (RAT).

At 1204, at a first communication frame, the first mobile device measures a first distance between the first mobile device and the second mobile device using a proximity detection signal. For example, the proximity detection signal may be a Bluetooth signal or a Wi-Fi signal. The distance between the first mobile device and the second mobile device may be estimated based at least in part on RSSI or SINR of the proximity detection signal. In some other examples, the proximity detection signal may be a UWB signal, and the distance between the first mobile device and the second mobile device may be estimated based at least in part on TOF of the UWB signal.

At 1206, the first mobile device compares the first distance to a threshold distance. For example, the threshold distance may correspond to a distance where free space path loss is less than a predetermined threshold value.

At 1208, upon determining that the first distance is less than the threshold distance, the first mobile device determines, at the first communication frame, whether one of the first mobile device or the second mobile device is operating in a primary state or both the first mobile device and the second mobile device are operating in a secondary state. The primary state may be configured for controlling communications with a plurality of devices.

At 1210, upon determining that one the first mobile device or the second mobile device is operating in the primary state, the first mobile device performs the D2D communication at the first communication frame using the first RAT. In this communication session, the power control methods described above may be applied when the first mobile device sends synchronization signals or discovery messages to the second mobile device.

At 1212, upon determining that both the first mobile device and the second mobile device are operating in the secondary state, the first mobile device performs the D2D communication at the first communication frame using a second RAT different from the first RAT. For example, the second RAT may include Bluetooth or Wi-Fi.

It should be appreciated that the specific steps illustrated in FIG. 12 provide a particular method of D2D communication according to some embodiments. Other sequences of steps may also be performed according to alternative embodiments. For example, alternative embodiments of the present disclosure may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

IV. Example Device

Figure 13:
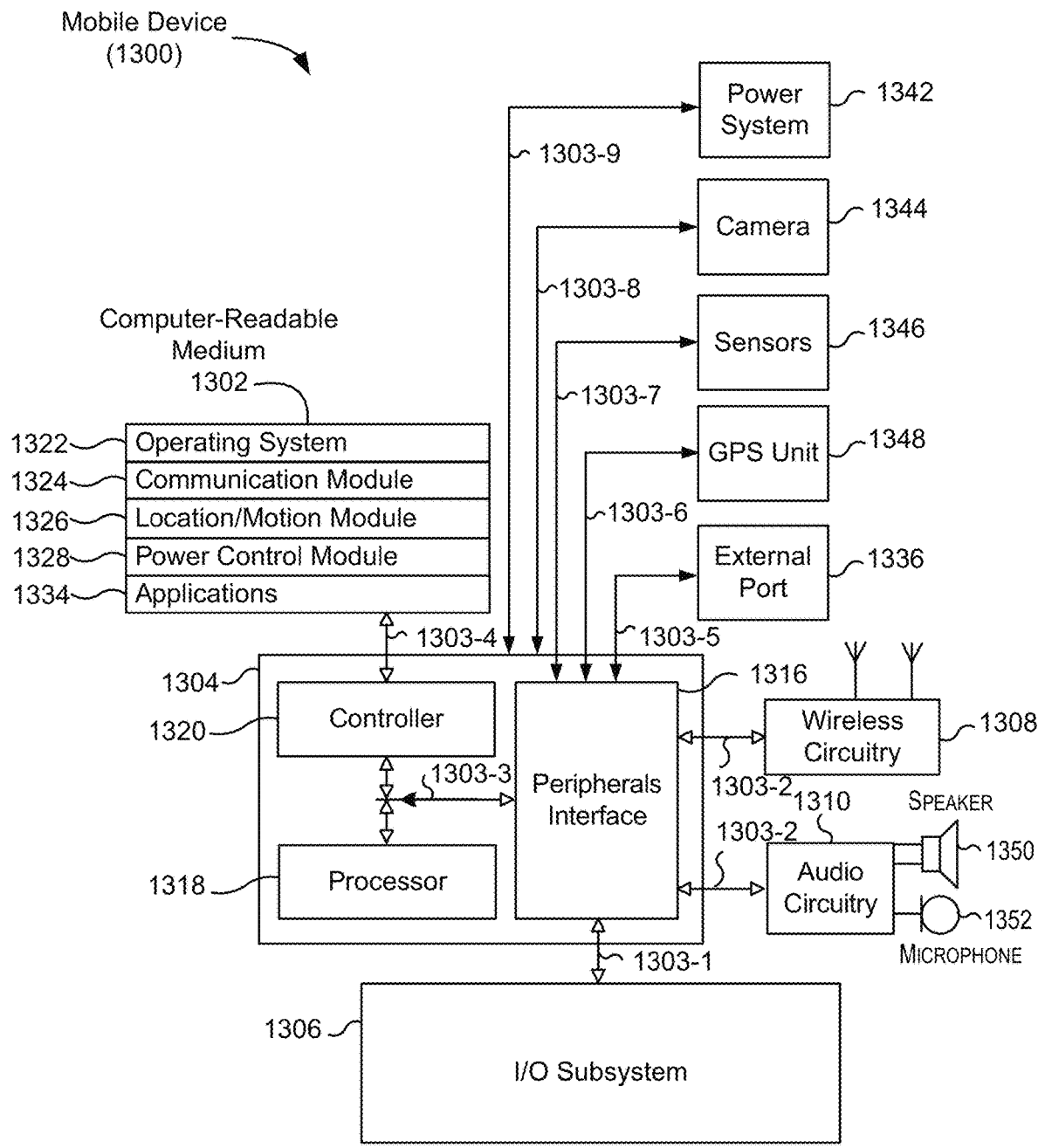
FIG. 13 is a schematic block diagram of an example mobile device.

FIG. 13 is a block diagram of an example device 1300, which may be a mobile device. Device 1300 generally includes computer-readable medium 1302, a processing system 1304, an Input/Output (I/O) subsystem 1306, wireless circuitry 1308, and audio circuitry 1310 including speaker 1350 and microphone 1352. These components may be coupled by one or more communication buses or signal lines 1303. Device 1300 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 13 is only one example of an architecture for device 1300, and that device 1300 can have more or fewer components than shown, or a different configuration of components. The various components shown in FIG. 13 can be implemented in hardware, software, or a combination of both hardware and software, including one or more signal processing and/or application specific integrated circuits.

Wireless circuitry 1308 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1308 can use various protocols, e.g., as described herein. For example, wireless circuitry 1308 can have one component for one wireless protocol (e.g., Bluetooth)® and a separate component for another wireless protocol (e.g., UWB). Different antennas can be used for the different protocols.

Wireless circuitry 1308 is coupled to processing system 1304 via peripherals interface 1316. Interface 1316 can include conventional components for establishing and maintaining communication between peripherals and processing system 1304. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on medium 1302.

Peripherals interface 1316 couple the input and output peripherals of the device to processor 1318 and computer-readable medium 1302. One or more processors 1318 communicate with computer-readable medium 1302 via a controller 1320. Computer-readable medium 1302 can be any device or medium that can store code and/or data for use by one or more processors 1318. Medium 1302 can include a memory hierarchy, including cache, main memory and secondary memory.

Device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1300 includes a camera 1344. In some embodiments, device 1300 includes sensors 1346. Sensors 1346 can include accelerometers, compasses, gyroscopes, pressure sensors, audio sensors, light sensors, barometers, and the like. Sensors 1346 can be used to sense location aspects, such as auditory or light signatures of a location.

In some embodiments, device 1300 can include a GPS receiver, sometimes referred to as a GPS unit 1348. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1318 run various software components stored in medium 1302 to perform various functions for device 1300. In some embodiments, the software components include an operating system 1322, a communication module (or set of instructions) 1324, a location module (or set of instructions) 1326, a power control module 1328 that is used as part of power control operations described herein, and other applications (or set of instructions) 1334.

Operating system 1322 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., USB, FireWire, Lightning connector, 60-pin connector, etc.) is adapted for coupling directly to other devices or indirectly over a network (e.g., the Internet, wireless LAN, etc.).

Location/motion module 1326 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1326 receives information from which a location fix can be derived, interprets that information, and returns location information, such as geographic coordinates, latitude/longitude, or other location fix data.

Power control module 1328 can perform power control operations as disclosed herein. Power control module 1328 can, for example, be connected to the power system 1342. Power control module 1328 can also be connected to sensors 1346 and/or location/motion module 1326 for proximity detection, so that transmit power can be adjusted accordingly, as discussed above.

The one or more applications programs 1334 on the mobile device can include any applications installed on the device 1300, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1306 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or track pad. In some embodiments, I/O subsystem 1306 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1300 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned herein are incorporated by reference in their entirety for all purposes. None is admitted to be prior art.

What is claimed is:

1. A method of device-to-device (D2D) communication, the method comprising performing, by a first mobile device:
   receiving an advertising signal from a second mobile device, the advertising signal requesting D2D communication;
   estimating a distance between the first mobile device and the second mobile device using a proximity detection signal;
   comparing the distance to a threshold distance; and
   upon determining that the distance is less than the threshold distance, transmitting a plurality of synchronization signals using a sequence of transmit power values for a plurality of slots of a communication frame, wherein the sequence of transmit power values includes a default transmit power value for at least one of the plurality of synchronization signals and at least one reduced transmit power value lower than the default transmit power value for at least another one of the plurality of synchronization signals.

2. The method of claim 1, wherein estimating the distance between the first mobile device and the second mobile device comprises performing, by the first mobile device:
   measuring a received signal strength indication (RSSI) of a beacon signal transmitted by the second mobile device; and
   estimating the distance between the first mobile device and the second mobile device based at least in part on the RSSI.

3. The method of claim 1, wherein estimating the distance between the first mobile device and the second mobile device comprises performing, by the first mobile device:
   measuring a time of flight for an Ultra Wideband (UWB) signal to travel from the second mobile device to the first mobile device; and
   estimating the distance between the first mobile device and the second mobile device based at least in part on the time of flight.

4. The method of claim 1, wherein the default transmit power value is about 30 dBm, the threshold distance corresponds to a path loss value of less than or equal to about 30 dB, and the reduced transmit power value is about 20 dBm.

5. The method of claim 1, wherein the reduced transmit power value is determined based at least on a path loss value at the threshold distance.

6. The method of claim 5, wherein an operating frequency of the D2D communication is different from a frequency of the proximity detection signal, and the reduced transmit power value is determined based at least on a difference between the operating frequency of the D2D communication and the frequency of the proximity detection signal.

7. The method of claim 1, wherein transmitting the plurality of synchronization signals comprises:
transmitting some synchronization signals of the plurality of synchronization signals at the reduced transmit power value in every other slot of the plurality of slots of the communication frame; and
transmitting remaining synchronization signals of the plurality of synchronization signals at the default transmit power value in remaining slots of the plurality of slots of the communication frame.

8. The method of claim 1, further comprising performing, by the first mobile device:
upon determining that the distance is less than the threshold distance, transmitting a first discovery message to the second mobile device at the reduced transmit power value in at least one frame of one or more subsequent communication frames, and transmitting a second discovery message to the second mobile device at the default transmit power value in at least another one frame of one or more subsequent frames.

9. The method of claim 1, further comprising performing, by the first mobile device:
detecting that the first mobile device and the second mobile device are moving away from each other; and
transmitting a second plurality of synchronization signals at the default transmit power value in every slot of one or more subsequent communication frames.

10. A non-transitory computer readable medium storing instructions that, when executed, control a first mobile device to perform device-to-device (D2D) communication, the instructions comprising:
receiving an advertising signal from a second mobile device, the advertising signal requesting D2D communication;
estimating a distance between the first mobile device and the second mobile device using a proximity detection signal;
comparing the distance to a threshold distance; and
upon determining that the distance is less than the threshold distance, transmitting a plurality of synchronization signals using a sequence of transmit power values for a plurality of slots of a subsequent communication frame, wherein the sequence of transmit power values includes a default transmit power value for at least one of the plurality of synchronization signals and at least one reduced transmit power value lower than the default transmit power value for at least another one of the plurality of synchronization signals.

11. The non-transitory computer readable medium of claim 10, wherein estimating the distance between the first mobile device and the second mobile device comprises performing:
measuring a received signal strength indication (RSSI) of a beacon signal transmitted by the second mobile device; and
estimating the distance between the first mobile device and the second mobile device based at least in part on the RSSI.

12. The non-transitory computer readable medium of claim 10, wherein estimating the distance between the first mobile device and the second mobile device comprises performing:
measuring a time of flight for an Ultra Wideband (UWB) signal to travel from the second mobile device to the first mobile device; and
estimating the distance between the first mobile device and the second mobile device based at least in part on the time of flight.

13. The non-transitory computer readable medium of claim 10, wherein the default transmit power value is about 30 dBm, the threshold distance corresponds to a path loss value of less than or equal to about 30 dB, and the reduced transmit power value is about 20 dBm.

14. The non-transitory computer readable medium of claim 10, wherein the reduced transmit power value is determined based at least on a path loss value at the threshold distance.

15. The non-transitory computer readable medium of claim 14, wherein an operating frequency of the D2D communication is different from a frequency of the proximity detection signal, and the reduced transmit power value is determined based at least on a difference between the operating frequency of the D2D communication and the frequency of the proximity detection signal.

16. The non-transitory computer readable medium of claim 10, wherein transmitting the plurality of synchronization signals comprises:
transmitting some synchronization signals of the plurality of synchronization signals at the reduced transmit power value in every other slot of the plurality of slots of the subsequent communication frame; and
transmitting remaining synchronization signals of the plurality of synchronization signals at the default transmit power value in remaining slots of the plurality of slots of the subsequent communication frame.

17. The non-transitory computer readable medium of claim 10, wherein the instructions further comprising:
upon determining that the distance is less than the threshold distance, transmitting a first discovery message to the second mobile device at the reduced transmit power value in at least one frame of one or more subsequent communication frames, and transmitting a second discovery message to the second mobile device at the default transmit power value in at least another one frame of one or more subsequent communication frames.

18. The non-transitory computer readable medium of claim 10, wherein the instructions further comprising performing:
detecting that the first mobile device and the second mobile device are moving away from each other; and
transmitting a second plurality of synchronization signals at the default transmit power value in every slot of one or more subsequent communication frames.

19. The method of claim 1, wherein transmitting the plurality of synchronization signals using the sequence of transmit power values comprises looping through the sequence of transmit power values.

20. A mobile device comprising:
one or more processors; and
a non-transitory computer readable medium storing instructions that, when executed by the one or more processors, control the mobile device to perform device-to-device (D2D) communication, the instructions comprising:

receiving an advertising signal from a second mobile device, the advertising signal requesting D2D communication;
estimating a distance between the mobile device and the second mobile device using a proximity detection signal;
comparing the distance to a threshold distance; and
upon determining that the distance is less than the threshold distance, transmitting a plurality of synchronization signals using a sequence of transmit power values for a plurality of slots of a communication frame, wherein the sequence of transmit power values includes a default transmit power value for at least one of the plurality of synchronization signals and at least one reduced transmit power value lower than the default transmit power value for at least another one of the plurality of synchronization signals.

\* \* \* \* \*